US009568768B2

(12) United States Patent
Tran et al.

(10) Patent No.: US 9,568,768 B2
(45) Date of Patent: Feb. 14, 2017

(54) WAVELENGTH MIXING OPTICAL COMPONENT

(71) Applicant: Radiant Choice Limited, Victoria, Mahe, SC (US)

(72) Inventors: Nguyen The Tran, Garden Grove, CA (US); Jiun-Pyng You, Costa Mesa, CA (US)

(73) Assignee: Radiant Choice Limited, Victoria, Mahe (SC)

( * ) Notice: Subject to any disclaimer, the term of this patent is extended or adjusted under 35 U.S.C. 154(b) by 54 days.

(21) Appl. No.: 14/694,850

(22) Filed: Apr. 23, 2015

(65) Prior Publication Data

US 2015/0378214 A1    Dec. 31, 2015

Related U.S. Application Data

(60) Provisional application No. 62/018,544, filed on Jun. 28, 2014.

(51) Int. Cl.
*G02F 1/1335* (2006.01)
*G02B 17/00* (2006.01)

(52) U.S. Cl.
CPC ......... *G02F 1/133603* (2013.01); *G02B 17/00* (2013.01); *G02F 1/133606* (2013.01)

(58) Field of Classification Search
CPC ................... G02F 1/133603; G02F 1/133606; G02B 17/00

USPC .......................................................... 349/62
See application file for complete search history.

(56) References Cited

U.S. PATENT DOCUMENTS

| | | | |
|---|---|---|---|
| 6,582,103 B1 | 6/2003 | Popovich et al. | |
| 6,679,621 B2 | 1/2004 | West et al. | |
| 7,254,309 B1 | 8/2007 | Chou et al. | |
| 7,414,270 B2 | 8/2008 | Kim et al. | |
| 7,621,657 B2 | 11/2009 | Ohkawa | |
| 7,837,370 B2 | 11/2010 | Bierhuizen et al. | |
| 8,042,965 B2 | 10/2011 | Peng et al. | |
| 8,227,969 B2 | 7/2012 | Yamaguchi et al. | |
| 8,596,829 B2 | 12/2013 | Yamaguchi | |
| 2006/0203484 A1* | 9/2006 | Yu | G02F 1/133603 362/231 |
| 2007/0258247 A1 | 11/2007 | Park et al. | |
| 2011/0222294 A1 | 9/2011 | Fan et al. | |
| 2014/0168970 A1 | 6/2014 | Choi et al. | |
| 2014/0204563 A1 | 7/2014 | Nguyen et al. | |
| 2015/0043222 A1 | 2/2015 | Jiang et al. | |
| 2015/0117021 A1 | 4/2015 | Chinniah et al. | |
| 2015/0378214 A1 | 12/2015 | Tran et al. | |

* cited by examiner

*Primary Examiner* — Lucy Chien
(74) *Attorney, Agent, or Firm* — Knobbe Martens Olson & Bear LLP

(57) ABSTRACT

The present disclosure includes an optical component including one or more microstructures configured to diffuse light incident thereto from within the optical component. The microstructures are provided at least on a light input surface of the optical component provided in a bottom cavity of its body.

20 Claims, 5 Drawing Sheets

WAVELENGTH MIXING OPTICAL COMPONENT

CROSS-REFERENCE TO RELATED APPLICATIONS

The present application claims benefit under 35 U.S.C. §119(e) of U.S. Provisional Application No. 62/018,544, filed on Jun. 28, 2014 and titled "Light Spreading and Mixing Lens." The disclosure of the above identified provisional patent application is incorporated by reference herein in its entirety.

BACKGROUND

Field

The present disclosure generally relates to optical components and systems that redistribute light emitted from a light source and, in particular for use with a light emitting diode.

Background

In many applications that use light emitting diode (LED) emitters as light sources, optical components, such as, for example, lenses, diffusers, reflectors, redirectors, etc. can be used to tailor the radiation pattern of the light emitted from the LED. In various implementations, a light source can include an array of LEDs. In such implementations, an array of optical components can be disposed over the array of LEDs such that each optical component in the array of optical components surrounds a corresponding LED in the array of LEDs to illuminate a large area of interest.

Recently, there is a demand for illumination panels that have a slim/thin profile and including fewer LEDs to reduce cost. Optical components that can achieve a desired luminance over an area with fewer LEDs can provide illumination panels with thin profile at a low cost.

Slim illumination panels utilizing white LEDs can also suffer from color non-uniformity. Accordingly, it is desirable to provide optical components that can mix different wavelengths of light emitted from white LEDs in order to reduce color non-uniformity. The foregoing discussion in this section is to provide background to the subject matter disclosed herein and does not constitute an admission of prior art.

SUMMARY

The systems, methods and devices of this disclosure each have several innovative aspects, no single one of which is solely responsible for the desirable attributes disclosed herein.

Various embodiments described herein comprise an optical component that can be used to spread light from a LED emitter over a wide angular range and simultaneously mix different wavelengths of light emitted from the LED emitter to achieve color uniformity. The embodiments of the optical component described herein can be used to redistribute light emitted from a LED emitter over a desired area of illumination such that the radiation pattern over illumination area is uniform. For example, in various implementations, the light intensity can be nearly constant across the illumination area. In various implementations, the optical component can be configured to reduce one or more peaks in the light intensity distribution to achieve a more uniform light distribution across an illumination surface.

The embodiments of optical elements described herein comprise one or more textured surfaces that can scatter and/or diffuse different wavelengths of light emitted from a LED emitter so as to mix the different wavelengths of light in the near field of the optical component and/or in the far field. In various implementations, the textured surfaces can include a plurality of microstructures. The plurality of microstructures can include grooves, protrusions, facets, surface or volume holograms, etc. The plurality of microstructures can be arranged to form a regular or an irregular pattern or can be arranged randomly.

Various embodiments described herein comprise an illumination device comprising a LED emitter and an optical component disposed over the LED. In various implementations, a reflector and/or a printed circuit board (PCB) can be integrated with a base of the optical component. The printed circuit board can be reflective. The reflectivity of the reflector and/or the PCB can affect the intensity of light in the region of the illumination surface directly overhead the optical component. Accordingly, the intensity of light across the illumination surface can be tailored by adjusting the reflectivity of the reflector and/or PCB integrated with the optical component. In various implementations, the reflector can be a diffused reflector. In various implementations, the surface of the reflector and/or the PCB adjacent the optical component can be textured to mix different wavelengths of light and/or to spread the light output from the optical component uniformly across the illumination surface. The optical component or the optical components in array are configured to distribute light emitted from the LED emitter uniformly over a wide angular range and simultaneously mix different wavelengths of light emitted from the LED emitter to achieve color uniformity. The illumination device can be included in a backlight with a thin profile or a slim profile architectural lighting panel to provide illumination to an illumination panel disposed at a distance from the LED emitter. Various implementations described herein can be used for backlighting in direct type or direct-lit display and liquid crystal display applications and for panel lighting applications. Various implementations of the illumination device can be included in a backlight with a thin profile or a slim profile architectural lighting panel.

One innovative aspect of the subject matter described in this disclosure can be implemented in an optical apparatus for use with a light source comprising at least one light emitting diode (LED). The apparatus comprises a single-piece, light-transmitting body comprising a top, a bottom and a side interconnecting the top and the bottom. An imaginary central axis of the body passes through the top and the bottom and does not pass through the side. The apparatus comprises at least one top curved surface formed on the top of the body and a bottom cavity formed into the body in a central portion of the bottom such that the central axis passes through the bottom cavity. The bottom cavity can be arranged relative to the light source such that the light source is placed under the bottom cavity and the central axis passes through the light source along with the top and bottom cavity. The bottom cavity can comprise at least one light input surface configured to receive light beams from the light source that are not reflected while propagating from the light source to the at least one light input surface when the bottom cavity and the light source are so arranged. The apparatus further comprises microstructures configured to diffuse light beams incident thereto and formed on the bottom of the body. The microstructures can be formed on the at least one light input surface of the bottom cavity. The bottom cavity can comprise a central portion and a peripheral portion. The central axis can pass through the central portion and the peripheral portion can be located around the central portion when viewed from the top along the central axis. The microstructures can be formed on the peripheral portion of the bottom cavity and not formed on the central portion of the bottom cavity.

The height of the body can be between about 3 mm to about 7 mm. The microstructures can be formed on the peripheral portion of the bottom cavity located at a distance between about 5 mm to about 9 mm from the central axis along a radial direction. The bottom comprises a bottom peripheral surface provided on the bottom around the bottom cavity when viewed from the top along the central axis, wherein the microstructures are formed on the bottom peripheral surface. In various implementations, a first bottom peripheral surface and a second bottom peripheral surface can be provided on the bottom around the bottom cavity. The first bottom peripheral surface can be interposed between the second bottom peripheral surface and the bottom cavity when viewed from the top along the central axis. In such implementations, the microstructures can be formed on the second bottom peripheral surface and are not formed on the first bottom peripheral surface. The second bottom peripheral surface with the microstructures can be inclined relative to an imaginary plane that is perpendicular to the central axis such that a first point on the second bottom peripheral surface closer to the central axis in a radial direction is raised relative to a second point on the second bottom peripheral surface farther from the central axis in a radial direction. The inclination of the second bottom peripheral surface can be generally symmetrical relative to the central axis. The apparatus can further comprise additional microstructures configured to diffuse light beams incident thereto and formed on a side surface of the side of the body. The side surface can comprise a first portion generally facing away from the bottom cavity in a direction along the central axis and a second portion generally facing away from the bottom cavity in radial directions from the central axis. In various implementations, the first and second portions can be immediately neighboring with each other. Additional microstructures can be disposed on both the first and second portions.

The microstructures can comprise a first microstructure that provides a plurality of micro-surfaces having different tangential planes, which can allow two or more parallel light beams incident on the first microstructure to reach different micro-surfaces of the first microstructure such that two or more parallel light beams can exit the first microstructure in different directions. All or part of the plurality of micro-surfaces can be continuously curved with or discretely separated from their immediately neighboring micro-surfaces.

In implementations where the light source is placed under the bottom cavity and the central axis passes through the light source along with the top and bottom cavity, the apparatus is configured to provide illumination characteristics such that at an optical distance within a range of 10-30 mm, an average correlated color temperature in a first region within 10 mm from the central axis is within about ±20% of an average correlated color temperature in a second region between 10 and 40 mm from the central axis.

In implementations where the light source is placed under the bottom cavity and the central axis passes through the light source along with the top and bottom cavity, the apparatus is configured to provide illumination characteristics such that a correlated color temperature is between 20000 K and 60000 K at an optical distance in a range of 10-30 mm.

In implementations where the light source is placed under the bottom cavity and the central axis passes through the light source along with the top and bottom cavity, the apparatus is configured to provide illumination characteristics such that at an optical distance between 10-30 mm, variation of correlated color temperature is less than 30% from the maximum correlated color temperature.

The apparatus can be incorporated in an illumination device comprising a light source comprising at least one light emitting diode (LED). The light source can be arranged relative to the apparatus such that the central axis passes the light source and light beams emitted from the light source are directed to the at least one light input surface without reflection before reaching the at least one light input surface. The illumination device can have illumination characteristics such that at an optical distance in a range of 10-30 mm, an average color temperature is within about ±20% of an average correlated color temperature of the at least one light emitting diode. The illumination device can have illumination characteristics such that a correlated color temperature at an optical distance in a range of 10-30 mm is between 60000 K and 20000 K.

A plurality of the illumination devices can be incorporated in an illumination system. In various implementations of the illumination system, the plurality of illumination devices can be aligned to form a linear arrangement or an array. The illumination system can be included in a back lighting unit of an LCD display panel. The LCD display panel can be incorporated in a consumer electronic device.

One innovative aspect of the subject matter described in this disclosure can be implemented in an illumination device comprising a light source configured to emit light at a plurality of wavelengths from a light emitting surface; and an optical component comprising a body. The body comprises a top surface; a side surface; a bottom surface; and a cavity accessible through an opening in the bottom surface, the cavity extending through the body and bounded by an inner surface, the inner portion comprising a plurality of microstructures such that the plurality of wavelengths light are scattered randomly in different direction when incident on the inner surface. The optical component is configured to redirect output light from the light source over an area of illumination. In various implementations, the device can comprise a reflector disposed adjacent the bottom surface of the optical component. The reflector can comprise a plurality of microstructures. The reflector can have a reflectivity configured to reduce variation in the correlated color temperature, illuminance and/or intensity of the output light.

In various implementations, at least a portion of the side surface can comprise a plurality of microstructures. At least a portion of the bottom surface can comprise a plurality of microstructures. At least a portion of the top surface can comprise a plurality of microstructures. The device can further include an annular structure disposed about the side surface. The device can further include a bottom panel and a top panel, wherein the LED is disposed on the bottom panel and light emitted from the optical element is incident on the top panel. The distance between the bottom panel and the top panel can be less than about 25 mm. The device can be configured as a backlight for a display device, wherein the top panel forms a portion of the display panel. The device can be configured as a lighting device.

One innovative aspect of the subject matter described in this disclosure can be implemented in an optical component comprising a body. The body comprises a top curved surface disposed about a central axis, the top surface comprising a central portion and a peripheral portion surrounding the central portion; a bottom surface opposite the top surface, the bottom surface comprising a central region and a peripheral region surrounding central region, the central region including an opening defining an inner cavity that extends through the body of the optical element toward top surface, the inner cavity bounded by a curved inner surface; and a side surface extending from the top surface to the bottom surface. At least a portion of the inner surface comprises a plurality of microstructures. A peripheral region of the bottom surface can be inclined away from the top surface such that the peripheral region is at an angle with respect to the central region.

In various implementations, the optical component can include a reflector disposed adjacent the bottom surface of the optical component. The reflector can comprise a plurality of microstructures. In various implementations, the reflector can be configured as a diffuser. At least a portion of the peripheral region can comprise a plurality of microstructures. In various implementations, a slope of a tangential line to the top surface in the central portion has an opposite sign from a slope of a tangential line to the top surface in the peripheral portion. At least a portion of the top surface can comprise a plurality of microstructures. The optical component can further comprise an annular structure disposed about the side surface. In various implementations, at least one surface of the annular structure can comprise a plurality of microstructures.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1A:
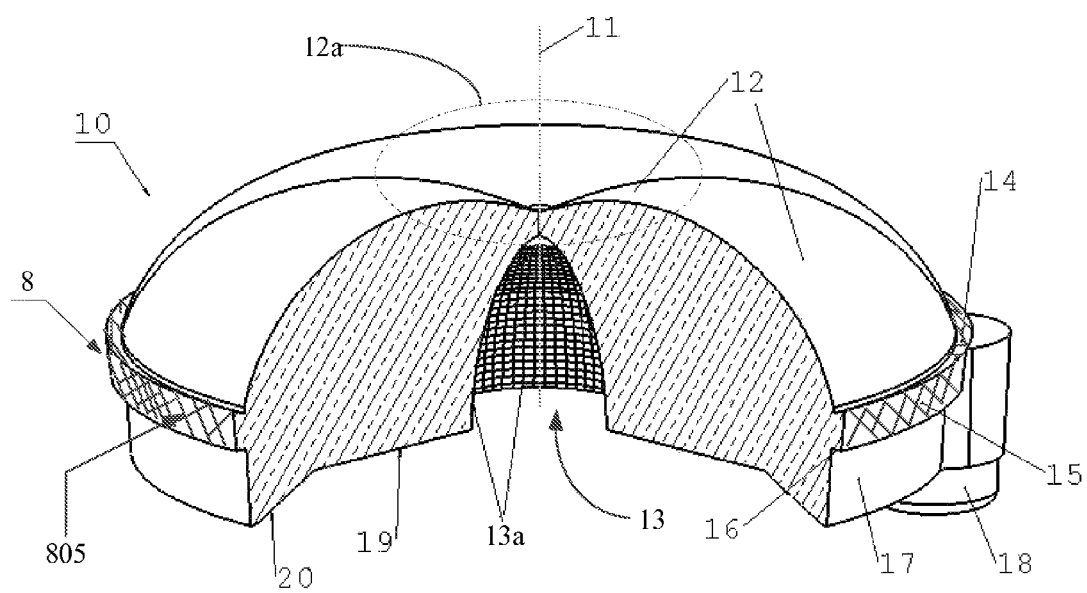
FIG. 1A illustrates a partially sectioned isometric view of an optical component configured to spread light emitted from a LED emitter.

The following detailed description is directed to certain implementations for the purposes of describing the innovative aspects. However, the teachings herein can be applied in a multitude of different ways. As will be apparent from the following description, the innovative aspects may be implemented in any device that is configured to provide illumination. More particularly, it is contemplated that the innovative aspects may be implemented in illumination systems, such as, a thin backlight and/or a frontlight unit configured to provide illumination to various display devices, such as, for example liquid crystal based display devices or LED based display devices. The described implementations may be implemented in any device, apparatus, or system that can be configured to display moving images, such as video, still images, such as photographs, text, graphics, and/or pictures. More particularly, it is contemplated that the described implementations may be included in or associated with a variety of electronic devices such as, but not limited to: mobile telephones, smart phones, multimedia Internet enabled cellular telephones, mobile television receivers, wireless devices, Bluetooth® devices, personal data assistants (PDAs), wireless electronic mail receivers, hand-held or portable computers, tablets, netbooks, notebooks, smartbooks, tablets, printers, copiers, scanners, facsimile devices, global positioning system (GPS) receivers/navigators, cameras, digital media players (such as MP3 players), camcorders, game consoles, wrist watches, clocks, calculators, television monitors, flat panel displays, electronic reading devices (e.g., e-readers), computer monitors, auto displays (including odometer and speedometer displays, etc.), cockpit controls and/or displays, camera view displays (such as the display of a rear view camera in a vehicle), electronic photographs, electronic billboards or signs, projectors, architectural structures, microwaves, refrigerators, stereo systems, cassette recorders or players, DVD players, CD players, VCRs, washers, dryers, washer/dryers, parking meters, billboards, signage, etc. Additionally, innovative aspects may be implemented in thin illumination systems and/or luminaires for commercial and/or residential lighting applications. For example, the embodiments described herein can be configured as slim profile lighting devices that can be incorporated in or used as a building material, such as, for example, walls, floors, ceilings of residential and commercial structures. Other uses are also possible.

Various embodiments of an optical component are described herein with reference to the accompanying figures. The terminology used in the description presented herein is not intended to be interpreted in any limited or restrictive manner, simply because it is being utilized in conjunction with a detailed description of certain specific embodiments. Furthermore, various embodiments of the optical component described herein can comprise several features, no single one of which is solely responsible for its desirable attributes or which is essential to achieve the light distribution profiles described herein.

The terms bottom, top and side are used in the present disclosure to designate or identify certain features described in the various implementations. However, these terms are used only to define relative positions of such features and should not be interpreted as carrying any meaning other than the relativity of positons of features reciting these terms.

Various embodiments of an optical component described herein can be configured to redistribute light emitted from a LED emitter. For example, the implementations of the optical component described herein can be configured to uniformly spread light emitted from the LED emitter over a wide angular range. Furthermore, the implementations of the optical component described herein can also be used to mix different wavelengths of light emitted from the LED emitter such that a high degree of color uniformity is achieved in the near field as well as the far field. Additionally, the implementations of the optical component described herein can also be configured to reduce peaks in the intensity distribution of light emitted from the LED emitter over an area of illumination such that the light intensity is nearly constant across the illumination area.

Various implementations described herein include a light bar including a plurality of LED emitters, each LED emitter associated with an optical component configured to tailor the radiation pattern of light emitted from the LED emitter to a desired radiation pattern. For example, the optical component associated with each LED emitter may be configured to spread the light emitted from the LED uniformly over a wide angular, reduce peaks in the intensity distribution of light emitted from the LED emitter and/or mix the different wavelengths emitted from the LED to reduce color non-uniformity.

LED Emitter

A light emitting diode (LED) is a semiconductor device that emits light in ultraviolet, visible and/or infrared wavelengths. Recent advances in semiconductor technology has led to the development of LEDs with high luminous efficacy that can generate light having the same amount of luminous flux as a standard 60 W or 100 W incandescent or fluorescent bulb with no more than 1 W of electrical power. LED emitters with high luminous efficacy can be miniaturized to have a size less than 10 mm such that they can be mounted on a printed circuit board (PCB) using semiconductor packaging techniques. The PCB can include driving circuits to supply required electrical current and voltage to the LED emitters. In various implementations, the PCB can also include heat sink and/or thermo-coolers to cool the LED emitters. Accordingly, a thin array of LED emitters that can provide a large amount of luminous flux using a small amount of electrical power can be manufactured. Such thin arrays of LED emitters are in great demand for a variety of display applications and/or lighting applications.

Early LED emitters primarily emitted light in the red and/or the infrared spectral range. However, recent developments in semiconductor technology have led to the development of LED emitters that can emit light in different regions of the ultraviolet (UV), visible and infrared (IR) spectrum. For example, LED emitters that can emit in the blue and violet regions of the visible spectrum have been developed recently. LED emitters that emit white light have also been developed. White LED (WLED) emitters can be realized in one of two ways. One method of producing a WLED emitter is to use LED emitters that emit contrasting colors and mix the contrasting colors. For example, a WLED emitter can include a cyan LED emitter and a yellow LED emitter such that light output from the cyan LED emitter and the yellow LED emitter are mixed to produce white light. As another example, a WLED emitter can include a red LED emitter, a green LED emitter and a blue LED emitter such that light output from the red, green and blue LED emitters can be mixed to produce white light. Another method of producing a WLED emitter is to use phosphor material that absorbs radiation and emits a white light. For example, a WLED emitted can include a RGB phosphor and a near-UV or a UV LED. The RGB phosphor can absorb the radiation from the near-UV or UV LED and emit a broad spectrum white light. As another example, a WLED emitted can include a yellow phosphor and a blue LED. The yellow phosphor can absorb the radiation from the blue LED and emit a broad spectrum white light.

LED emitters are desirable in backlights and frontlights for display devices as well as in lighting due to their high luminous efficacy, long lifetimes, low manufacturing cost and miniaturization capabilities.

LED emitters can generally be divided into two classes: side-emitting emitters and top-emitting emitters. In top-emitting LED emitters, light is emitted along a direction perpendicular to the surface of the LED emitter. In side-emitting LED emitters, light is emitted along a direction parallel to the surface of the LED. Most top-emitting LED emitters exhibit a Lambertian emission pattern, where the intensity profile is proportional to the cosine of the emission angle, which is measured from a normal to the surface of the LED emitter.

LED emitters usually emit light from a small area. For example, the emission area can be less than 1 $mm^2$. Thus, optical components that can reflect, refract collimate, focus, diffuse and/or diffract light are integrated with the LED emitter to tailor the pattern of radiation emitted from the LED emitter.

Conventional optical elements that are configured to collect light from WLED emitters may not be capable of mixing the different wavelengths of light efficiently which may result in color non-uniformity at the illumination surface and/or at the surface of the optical component. For example, average correlated color temperature in a central portion of the illuminated region may be different than the average correlated color temperature in a peripheral portion of the illuminated region. Moreover, the average correlated color temperature in various portions of the illuminated region may be lower than the average color temperature of the LED emitter. Accordingly, it would be desirable to provide optical components that can spread light from LED emitters uniformly and/or monotonically and/or with higher degree of color uniformity.

Various implementations of light spreading and/or color mixing optical components described herein include one or more textured light input surfaces that are configured to receive different wavelengths of light emitted from the LED emitter and redirect the different wavelengths of light such that light output from the optical component and incident on an illumination surface disposed at an optical distance between about 10-30 mm has a high degree of color uniformity. For example, various implementations of optical component described herein include one or more textured light input surfaces that are configured to spatially mix different wavelengths of light emitted from the LED emitter such that a variation between a maximum correlated color temperature (CCT) and a minimum CCT is less than 60% of the maximum CCT. As another example, various implementations of optical component described herein include one or more textured light input surfaces that are configured to spatially mix different wavelengths of light emitted from the LED emitter such that an average CCT across the illumination surface is substantially similar to the average CCT of the LED emitter.

In various implementations of the light spreading and/or color mixing optical components described herein, one or more output surfaces can also be textured to improve color uniformity and/or to distribute light uniformly across the illumination surface.

Light Spreading and Color Mixing Optical Component

FIG. 1A illustrates a partially sectioned isometric view of an embodiment of an optical component 10 configured to spread light emitted from a LED emitter as well as mix different wavelengths of light emitted from the LED emitter. In various implementations, the optical component 10 can be configured to spread light emitted from the LED emitter uniformly across an illumination panel such that the intensity of light across the illumination panel is nearly constant. In various implementations, the optical component 10 can be configured to spread light emitted from the LED emitter across an illumination panel such that the such that the illuminance in a region located at a distance less than or equal to about 25 mm from a point where the central axis normal to the optical component intersects the panel is greater than 75% of the maximum illuminance on the illumination panel, when an area about the point where the central axis of the optical component intersects the illumination surface where the illuminance from a single LED coupled to the optical component falls to about 50% of the maximum illuminance is at least about 80 square cm ($cm^2$). In various implementations, the optical component 10 can be configured such that the illuminance in a region located at a distance less than or equal to about 10 mm from a central axis normal to the optical component is greater than 80% of the maximum illuminance on the illumination panel. In various implementations, the optical component 10 can be configured such that the illuminance in a region located at a distance between about 20 mm and about 50 mm from a central axis normal to the optical component is between about 50% and about 90% of the maximum illuminance on the illumination panel. Without subscribing to any theory, as used herein, illuminance is a measure of the luminous flux incident per unit area of an illumination surface and can be correlated with the intensity of light incident per unit area of the illumination surface. In various implementations, the illuminance across the surface can be measured using a lux meter.

Figure 1B:
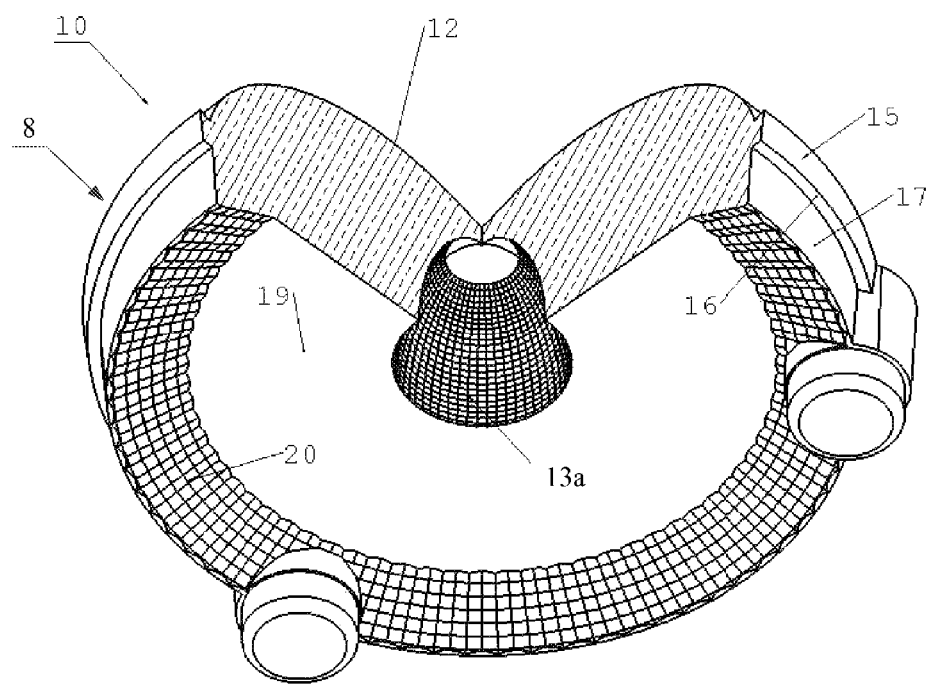
FIG. 1B illustrates a different partially sectioned isometric view of the embodiment of the optical element illustrated in FIG. 1A.
Figure 1C:
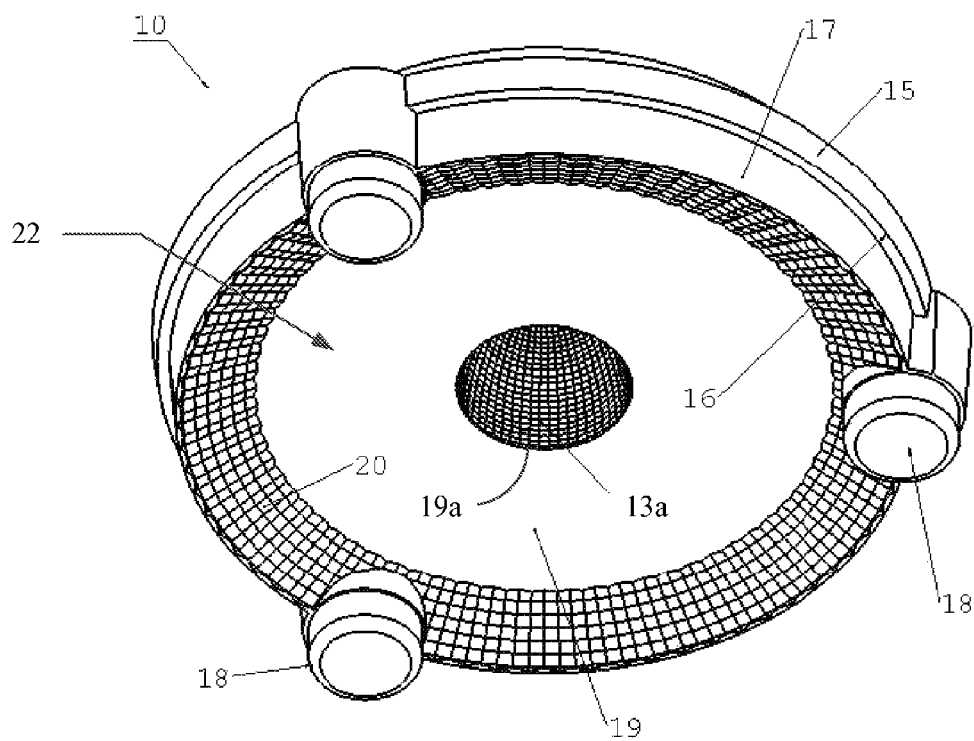
FIG. 1C illustrates an isometric view of the embodiment of the optical component shown in FIG. 1A.

FIG. 1B illustrates a different partially sectioned isometric view of the embodiment of the optical element illustrated in FIG. 1A and FIG. 1C illustrates an isometric view of the embodiment of the optical component shown in FIG. 1A.

The optical component 10 can be disposed about a central axis 11. In various implementations, the optical component 10 can be rotationally symmetric about the central axis 11. Without any loss of generality, a direction along the central axis 11 can represent the vertical direction and a direction perpendicular to the central axis 11 can represent the horizontal direction. In implementations of the optical component 10 having a circular cross-section in a plane perpendicular to the central axis 11, the central axis 11 can pass through the center of the circular cross-section. In various implementations of the optical component 10, the central axis 11 can pass through the centroid of the optical component 10. In various implementations of the optical component 10, the central axis 11 can pass through a geometric center of the optical component 10.

Various implementations of the optical component 10 comprises a top surface 12, an inner cavity 13 bounded by an inner surface 13a, a bottom surface 19 opposite the top surface 12 and a side surface 17 joining the bottom surface 19 and the top surface 12. In various implementations, the optical component 10 can include one or more supporting posts 18 disposed along the bottom surface 19. The optical component 10 can be integrated with a reflector. For example, the optical component 10 can be disposed on the reflector such that the bottom surface 19 is adjacent the reflector. The reflector can comprise an opening that is configured to allow light from the LED emitter to be coupled into the optical component. The LED emitter can be disposed on a printed circuit board (PCB). In various implementations, one or more surfaces of the PCB adjacent the bottom surface 19 of the optical component 10 can be reflective. In such implementations, the reflective surface of the PCB can function as the reflector. Accordingly, a reflector need not be integrated with the bottom surface 19 of the optical component 10 in such implementations. The reflectivity of the reflector can affect the intensity of light in the region of the illumination surface directly overhead the optical component. Accordingly, the intensity of light across the illumination surface can be tailored by adjusting the reflectivity of the reflector integrated with the optical component 10. In various implementations, the reflector can be a diffused reflector. In various implementations, the surface of the reflector and/or the PCB adjacent the optical component can be textured to mix different wavelengths of light and/or to spread the light output from the optical component uniformly across the illumination surface.

The optical component 10 can have a maximum height between about 5-10 mm (e.g., about 5.5 mm, 6 mm, about 7 mm, about 8 mm, about 9 mm). A maximum lateral extent of the optical component 10 from the central axis can be between about 6-10 mm (e.g., about 7 mm, about 8 mm, about 9 mm). In implementations of the optical component 10 having a top surface 12 with a circular cross-section in a plane perpendicular to the central axis, the maximum diameter of the top surface 12 can be between about 12-20 mm (e.g., 13 mm, 14 mm, 15 mm, 16 mm, 17 mm, 18 mm, 19 mm, 20 mm).

Textured Annular Structure

Figure 3:
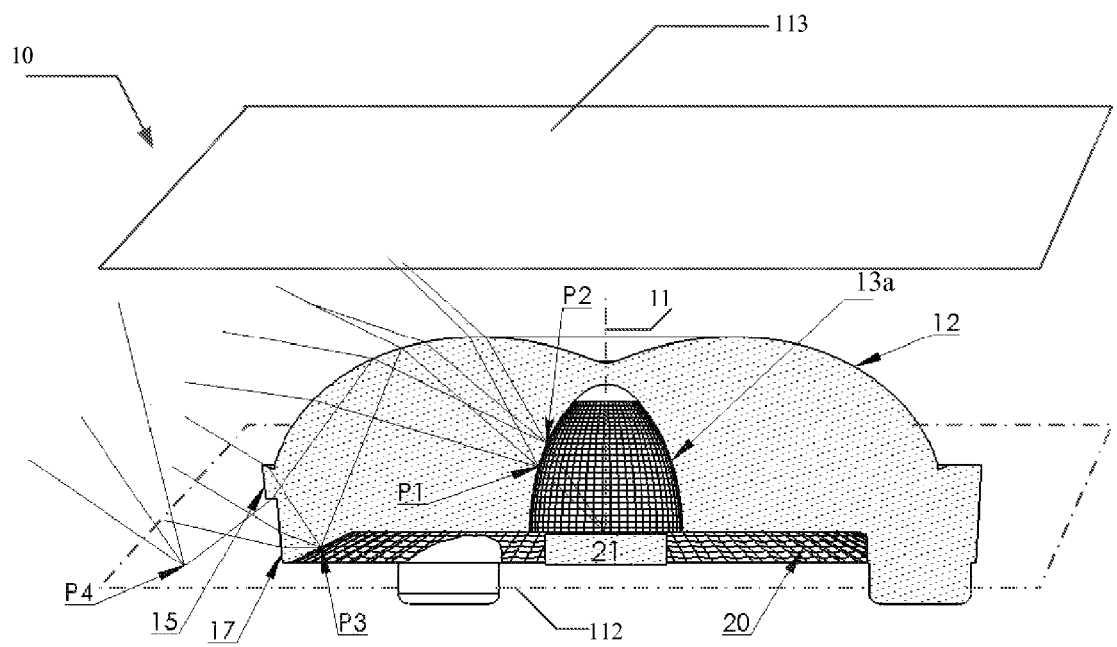
FIG. 3 illustrates a side-view of an embodiment of an optical component configured to mix different wavelengths of light emitted from a LED emitter and/or reduce peaks in the intensity distribution of light emitted from a LED emitter.

The optical component 10 can further include an annular structure 8 disposed about the side surface 17. In various implementations, the annular structure 8 can form a border between the top surface 12 and the side surface 17 as shown in FIGS. 1A-1C. Alternately, in some embodiments, the annular structure 8 can form a border between the bottom surface 19 and the side surface 17. In some implementations, the annular structure 8 can be in the mid-section of the side surface 17 such that it divides the side surface 17 into an upper portion and a lower portion. In some other implementations, the entire side surface 17 could be configured as the annular structure 8 such that a separate annular structure is not provided. The annular structure 8 can be continuous or include a plurality of discontinuous linear or curved segments. The annular structure 8 may be configured to alter the radiation pattern of the light emitted from a LED emitter disposed with respect to the optical component 10. In various implementations, the annular structure 8 can be integrated with the reflector and/or the PCB on which the LED emitter is disposed (for example, as shown in FIG. 3).

In the implementations illustrated in FIGS. 1A-1C, the annular structure 8 is configured as a ring that extends from the side surface 17 and surrounds the optical element 10. In the implementations illustrated in FIGS. 1A-1C, the annular structure 8 can be configured to form a lip or a rim. Accordingly, with reference to FIGS. 1A-1C, the annular structure 8 can be referred to as a ring step structure. As shown in FIGS. 1A-1C, the annular structure 8 includes a top surface 14, a side surface 15 and a bottom surface 16. However, in other implementations, the annular structure 8 can comprise less than or more than three surfaces. For example, in some implementations, the annular structure 8 may comprise only a side surface. As another example, in some implementations, the annular structure 8 may comprise only a top surface and a side surface. As yet another example, the annular structure 8 may comprise only a bottom surface and a side surface. In some other implementations, the annular structure 8 may comprise 4, 5, 6, 8 or 10 surfaces. Although, in FIGS. 1A-1C, the annular structure 8 is depicted as a ring, in other implementations, the annular structure 8 can be a partial ring structure.

In various implementations, one or more surfaces of the annular structure 8 can be partially or completely textured. Partial or complete texturing of one or more surfaces of the annular structure 8 can be accomplished by providing a plurality of microstructures 805. The plurality of microstructures 805 can include grooves, protrusions, facets, surface or volume holograms, gratings, etc. In various implementations, the plurality of microstructures can be arranged randomly. However, in other implementations, the plurality of microstructures can be arranged to form a regular or an irregular pattern. The plurality of microstructures can have a size between about 1 micron and about 1 mm. In various implementations, the density of the plurality of microstructures can be between $1000/mm^2$ and $1/mm^2$.

In various implementations, the density of the plurality of microstructures disposed on one or more surfaces of the annular structure 8 can be between $10/mm^2$ and $30/mm^2$, between $20/mm^2$ and $50/mm^2$, between $25/mm^2$ and $100/mm^2$, between $40/mm^2$ and $75/mm^2$, between $50/mm^2$ and $100/mm^2$, between $75/mm^2$ and $200/mm^2$, between $125/mm^2$ and $250/mm^2$, between $150/mm^2$ and $300/mm^2$, between $200/mm^2$ and $400/mm^2$, between $250/mm^2$ and $500/mm^2$, between $300/mm^2$ and $450/mm^2$, between $500/mm^2$ and $750/mm^2$, between $550/mm^2$ and $800/mm^2$, between $600/mm^2$ and $700/mm^2$, between $750/mm^2$ and $850/mm^2$, between $800/mm^2$ and $1000/mm^2$, or values therebetween.

In various implementations, the plurality of microstructures can have a size such that an individual microstructure is not resolved by a normal human eye without the aid of magnification. Each of the plurality of microstructures 805 can have a size in a range between 1 micron and about 100 microns. For example, in implementations where some of the plurality of microstructures 805 include grooves, a depth (or height) of grooves can be in the range between about 1 micron and about 10 microns, between about 5 micron and about 20 micron, between about 10 microns and about 30 microns, between about 30 microns and about 50 microns, between about 40 microns and about 75 microns, between about 50 microns and about 80 microns, between about 75 microns and about 100 microns, or values therebetween.

As another example, in implementations where some of the plurality of microstructures include facets, a height of the facets can be in the range between about 1 micron and about 10 microns, between about 5 micron and about 20 micron, between about 10 microns and about 30 microns, between about 30 microns and about 50 microns, between about 40 microns and about 75 microns, between about 50 microns and about 80 microns, between about 75 microns and about 100 microns, or values therebetween.

For example, in implementations where some of the plurality of microstructures include gratings, a depth of the gratings and/or the distance between two consecutive gratings can be in the range between about 1 micron and about 10 microns, between about 5 micron and about 20 micron, between about 10 microns and about 30 microns, between about 30 microns and about 50 microns, between about 40 microns and about 75 microns, between about 50 microns and about 80 microns, between about 75 microns and about 100 microns, or values therebetween.

Top Surface of the Optical Component

The top surface 12 can comprise a central portion 12a and a peripheral portion surrounding the central portion 12a. In various implementations, the top surface 12 can be planar or curved. For example, the top surface 12 can be concave, convex or an aspheric. In implementations of the optical component 10 wherein the top surface 12 is curved, the top surface 12 can be formed by a rotating a curved segment about the central axis 11. Accordingly, in such implementations, the top surface 12 can be rotationally symmetric about the central axis 11. In various implementations, the top surface 12 can appear to be dome shaped or bell shaped as viewed along the central axis 11 from a position above the top surface 12. In various implementations, the top surface 12 can be a part of a sphere such that a cross-section of the top surface 12 in a plane perpendicular to the central axis 11 is a circle. In various implementations, the top surface 12 can be a part of an ellipsoid such that a cross-section of the top surface 12 in a plane perpendicular to the central axis 11 is an ellipse. In some implementations, the top surface 12 can comprise a plurality of curved sections such that a cross-section of the top surface 12 in a plane perpendicular to the central axis 11 comprises a plurality of concave or convex curves. For example, the top surface 12 can comprise a plurality of curved sections such that a cross-section of the top surface 12 in a plane perpendicular to the central axis 11 has a flower shape.

In various implementations, the top surface 12 can be partially or entirely textured by providing a plurality of microstructures. The plurality of microstructures can include grooves, protrusions, facets, surface or volume holograms, gratings, etc. In various implementations, the plurality of microstructures can be arranged randomly. However, in other implementations, the plurality of microstructures can be arranged to form a regular or an irregular pattern. The density of the plurality of microstructures disposed on the top surface 12 can be between $1/mm^2$ and $1000/mm^2$. The ranges of the size and density of the microstructures disposed on the top surface 12 can be similar to the ranges provided above. The plurality of microstructures on the top surface 12 can further increase color mixing capability of the optical component 10. In some implementations, texturing the top surface 12 can reduce intensity spreading. In such implementations, the density of the plurality of microstructures can be adjusted to provide increased color mixing without significantly reducing the spread in the intensity of output light.

In various implementations, the curvature of the top surface 12 can be configured such that the central portion 12a is recessed such that a vertical distance between points in the central region 12a and the bottom surface 19 is shorter than a vertical distance between points outside the central region 12a (e.g., the peripheral region) and the bottom surface 19. For example, the central portion 12a can be shaped like a funnel or an inverted bell. In some such implementations, the top surface 12 can have a curvature such that an internal angle between a tangential line to the portion of the surface included in the central section 12a and the central axis 11 in air is less than 90 degrees and an internal angle between a tangential line to the portion of the surface outside the central section 12a and the central axis 11 is greater than 90 degrees.

Side Surface of the Optical Component

The side surface 17 of the optical component 10 can be formed by rotating a curved segment around the central axis 11. In various implementations, the side surface 17 can be configured as a cylindrical surface disposed about the central axis 11. Accordingly, in such implementations, the side surface 17 is rotationally symmetric about the central axis 11. In some embodiments, the side surface 17 may be configured to widen near the bottom surface 19 and narrow toward the top surface 12. Alternately, in some embodiments, the side surface 17 may be configured to narrow near the bottom surface 19 and widen toward the top surface 12.

Bottom Surface of the Optical Component

The bottom surface 19 can be planar or curved. For example, in various implementations, the bottom surface 19 can appear to be concave, convex or aspheric as viewed along the central axis 11. The bottom surface 19 can have a circular or elliptical cross-section in a plane perpendicular to the central axis 11. Alternately, in some implementations, the cross-section of the bottom surface 19 in a plane perpendicular to the central axis 11 can be a polygon. The bottom surface 19 can comprise a central region 22 and a peripheral region 20. The bottom surface 19 includes an opening 19a to the inner cavity 13. The opening 19a can be located in the central region of the bottom surface 19.

In various implementations, the peripheral region 20 can be inclined with respect to the central region 22. For example, in various implementations, the peripheral region 20 can be configured such that a tangential line to the peripheral region 20 forms an angle with respect to a tangential line to the central region 22. In various implementations, the peripheral region 20 can slope downward as a radial distance from the central axis 11 increases. In such implementations, an angle between a tangential line to the peripheral region 20 and the central axis 11 can be smaller than an angle between a tangential line to the central region 22 and the central axis 11. Such a geometry can be advantageous in reducing peaks in the distribution of intensity of light emitted from an LED emitter as discussed below. In various implementations, the peripheral region 20 can be partially or completely textured. Partial or complete texturing of the peripheral region 20 can be advantageous in reducing intensity peaks in the distribution of intensity of light at the output of the optical component 10. Partial or complete texturing of the peripheral region 20 can be accomplished by providing a plurality of plurality of microstructures. The plurality of microstructures can include grooves, protrusions, facets, surface or volume holograms, gratings, etc. In various implementations, the plurality of microstructures can be arranged randomly. However, in other implementations, the plurality of microstructures can be arranged to form a regular or an irregular pattern. The plurality of microstructures can have a size between about 1 micron and about 1 mm. In various implementations, the density of the plurality of microstructures can be between 1000/mm$^2$ and 1/mm$^2$. The ranges of the size and density of the microstructures disposed on the surfaces of the peripheral region 20 can be similar to the ranges provided above.

Inner Cavity of the Optical Component

As discussed above, the inner cavity 13 can be bounded by an inner surface 13a. The inner surface 13a can have a dome shape or a bell shape as viewed along the central axis 11 through the bottom surface. The inner surface 13a can be formed by rotating a curve about the central axis 11. The curve can have any shape. For example, the curve can be concave, convex, aspheric, parabolic or elliptical. Accordingly, in various implementations, a cross-section of the inner surface 13a in a plane including the central axis 11 can be convex, aspheric, parabolic or elliptical. The cross-section of the inner surface 13a in a plane perpendicular to the central axis 11 can be circular or elliptical. In various implementations, an angle between a tangential line to the curve forming the inner surface 13a and the central axis 11 can be small in regions of the inner surface 13a adjacent the bottom surface 19 and large in regions of the inner surface 13a adjacent the top surface 12. For example, the angle between a tangential line to the curve forming the inner surface 13a and the central axis 11 can be between about 0 degrees and about 30 degrees in regions of the inner surface 13a adjacent the bottom surface 19. As another example, the angle between a tangential line to the curve forming the inner surface 13a and the central axis 11 can be between about 60 degrees and about 90 degrees in regions of the inner surface 13a adjacent the top surface 12.

In various implementations, the inner surface 13a can be partially or completely textured. Partial or complete texturing of the inner surface 13a can be accomplished by providing a plurality of plurality of microstructures. The plurality of microstructures can include grooves, protrusions, facets, surface or volume holograms, gratings, etc. In various implementations, the plurality of microstructures can be arranged randomly. However, in other implementations, the plurality of microstructures can be arranged to form a regular or an irregular pattern. The plurality of microstructures can have a size between about 1 micron and about 1 mm. In various implementations, the density of the plurality of microstructures can be between 1000/mm$^2$ and 1/mm$^2$. The ranges of the size and density of the microstructures disposed on the inner surface 13a can be similar to the ranges provided above. The textured inner surface 13a can advantageously mix the different wavelengths of light emitted from a light source disposed within the inner cavity 13 and reduce color non-uniformity in the near-field and/or far-field radiation pattern emitted from the optical component 10, as discussed in detail below.

Optical Component Coupled to a LED Emitter

Figure 2:
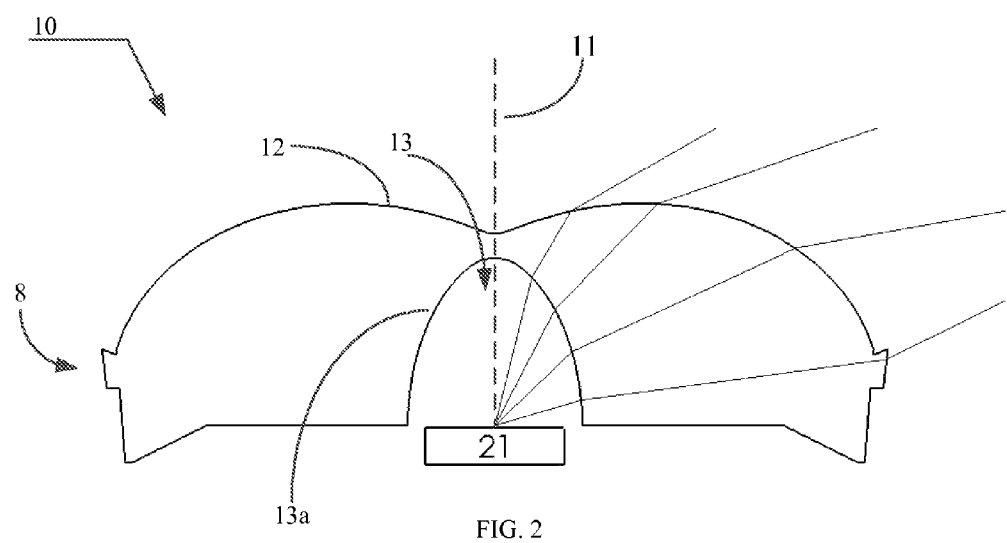
FIG. 2 illustrates a side-view of the optical component illustrated in FIG. 1A disposed over a LED emitter.

FIG. 2 illustrates a side-view of the optical component 10 disposed over a LED emitter 21. The LED emitter 21 can emit a plurality of wavelengths. For example, the LED emitter 21 can be a WLED and emit wavelengths in the yellow and blue spectral range. The optical component 10 can be disposed over the LED emitter 21 such that the central axis 11 coincides with a central axis of the LED emitter 21. In various implementations, optical component 10 and the LED emitter 21 can be disposed such that the central axis 11 of the optical component 10 and the central axis of the LED emitter 21 coincide with a vertical direction. The inner cavity 13 can have a size and a shape such that when the optical component 10 is disposed over the LED emitter 21, the inner cavity envelopes the LED emitter 21 such that most of the light emitted from the LED emitter 21 is collected by the optical component 10. For example, in various implementations, the inner surface 13a can be configured to collect between about 50% and about 99% of the light emitted from the LED emitter 21. In various implementations, the curvatures of the central and peripheral surfaces of the top surface 12 and the inner surface 13a are configured to direct light emitted from the LED emitter 21 along directions away from the central axis 11. Configuring the curvatures of the top surface 12 and the inner surface 13a such that light emitted from the LED emitter 21 are redirected along directions away from the central axis 11 can be advantageous in distributing light emitted from the LED emitter 21 over a wide angle. In various implementations, light emitted from the LED emitter 21 can be redistributed by the optical component 10 in a region having an angular extent between about −90 degrees and about 90 degrees with respect to the central axis 11. For example, light emitted from the LED emitter 21 can be redistributed by the optical component 10 in a region having an angular extent between about −80 degrees and about 80 degrees with respect to the central axis 11, between about −70 degrees and about 70 degrees with respect to the central axis 11, between about −60 degrees and about 60 degrees with respect to the central axis 11, between about −50 degrees and about 50 degrees with respect to the central axis 11 or between about −40 degrees and about 40 degrees with respect to the central axis 11.

Distribution of Light Across an Illumination Panel at the Output of the Optical Component Usually, light distributed by conventional optical components that are integrated with LED emitters across an illumination surface can have a varying illuminance (or intensity) profile with illuminance (or intensity) peaks and dips. For various applications, such peaks and dips in the intensity profile across the illumination surface may be undesirable. Implementations of optical components similar to the embodiment of optical component 10 that are configured to redistribute light from the LED emitter 21 by redirecting light emitted from the LED emitter in a certain angular range to regions located away from the central axis 11 of the optical component 10 are desirable since they may reduce the intensity of one or more peaks in the illuminance (or intensity) profile and provide a more uniform distribution of light.

The light spreading mechanism of the optical component 10 illustrated in FIGS. 1A-1C is explained with reference to FIG. 2. Light emitted from the LED emitter 21 is incident on the inner surface 13a of the inner cavity 13 and refracted by the inner surface 13a toward the top surface 12. As discussed above, the curvature of the top surface 12 is configured such that light incident from the inner cavity 13 propagates along directions away from the central axis 11. Light incident on the portion of the inner surface 13a that is closer to the top surface 12 propagates towards the central portion 12a of the top surface 12. Light incident on the portion of the inner surface 13a that is closer to the bottom surface 19 propagates towards annular structure 8 and the side surface 17. As discussed above, one or more surfaces of the annular structure 8 and the side surface 17 could be textured such that light incident on annular structure 8 and the side surface 17 is diffused or scattered. In this manner light emitted from the LED emitter 21 can be uniformly distributed over an area of an illumination surface such that the intensity of light intensity of light at every 1 mm$^2$ region of the illumination surface in an area between about 1-80 cm$^2$ around the central axis 11 is not less than 50% of the maximum intensity on the illumination surface. Furthermore, the optical component 10 can be configured such that the illumination area has a large size. For example, in various implementations, the angle subtended by illumination area at the LED emitter 21 can be between about −80 degrees and 80 degrees with respect to the central axis 11.

Reduction of Color Non-Uniformity at the Output of the Optical Component

Figure 6A:
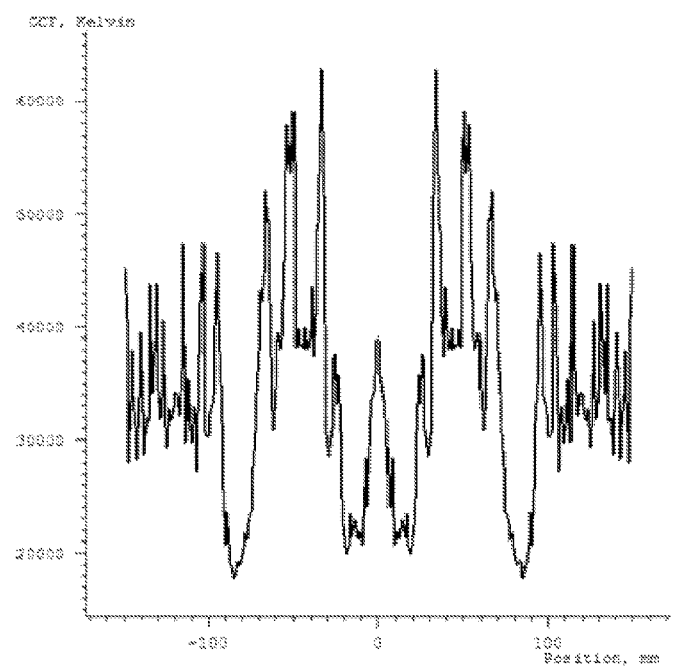
FIG. 6A illustrates the variation in the correlated color temperature (CCT) across an illumination surface disposed at a distance from an illumination system comprising a LED emitter.

In implementations, where the LED emitter 21 is polychromatic (e.g., a WLED), the emitted light can have color non-uniformity on the emitting surface of the LED emitter 21 or in the vicinity of the LED emitter 21. This color non-uniformity can be referred to spatial color non-uniformity and/or near-field angular color non-uniformity. The color non-uniformity in LED emitter 21 can result in the light extracted from the optical component 10 to have color non-uniformity as well. For example, light extracted from the optical component 10 and incident on the illumination surface can exhibit change in color that results in rings of different colors and/or gradual change in color which can cause the average correlated color temperature (CCT) across a region of the illumination surface to be different from the average color temperature of the LED emitter 21. Conventional optical components may not be able to reduce the color non-uniformity as the optical distance (OD) between the LED emitter 21 and the illumination panel becomes smaller (e.g., less than or equal to about 25 mm). The color non-uniformity across the illumination surface disposed at a distance between about 10-30 mm from a LED emitter that can result when the LED emitter is optically coupled with a conventional light redistributing optical element is illustrated in FIG. 6A. It is observed from FIG. 6A that the average CCT in a central illumination region located within a distance of about 10 mm from a position on the illumination surface that intersects the central axis of the LED emitter is about 50% of the maximum CCT on the illumination surface. The variation in the CCT between the central illumination region located within a distance of about 10 mm from a position on the illumination surface that intersects the central axis of the LED emitter and the illumination region located within a distance between about 40-80 mm from the position on the illumination surface that intersects the central axis of the LED emitter can result in the formation of yellow and blue rings in the illumination pattern which may be undesirable in certain applications.

It is further noted that a variation between a maximum correlated color temperature (CCT) and a minimum CCT is greater than 60% of the maximum CCT on the illumination surface which can also be undesirable. Additionally, the average CCT across the illumination surface may be substantially different from the average CCT of the LED emitter which can also be undesirable. The embodiments of optical components described herein are configured to reduce color non-uniformity at optical distance less than or equal to 25 mm as well as greater than 25 mm.

In order to reduce the color non-uniformity in the light emitted from the LED emitter 21, the ability to mix and/or blend different wavelengths of light is introduced at one or more surfaces of the optical component 10. For example, the textured inner surface 13a can be capable of mixing and/or blending the different wavelengths of light emitted from the LED emitter 21. The textured inner surface 13a can mix and/or blend different wavelengths of light emitted from the LED emitter 21 by scattering as explained in detail below with reference to FIG. 3.

Color Mixing

FIG. 3 illustrates a side-view of an embodiment of the optical component 10 configured to mix different wavelengths of light emitted from a LED emitter 21 and/or reduce peaks in the intensity distribution of light emitted from a LED emitter 21. The LED emitter 21 can be disposed on a PCB 112. Light emitted from the LED emitter 21 is directed in an upward direction away from the central axis 11 towards an illumination panel 113. In some implementations, the optical distance between the LED emitter 21 and the illumination panel 113 can be between 10-30 mm (e.g., less than or equal to 25 mm, less than or equal to 20 mm, between 13-20 mm, between 15-18 mm, etc.). In some other implementations, the optical distance between the LED emitter 21 and the illumination panel 113 can be greater than 25 mm.

The color mixing and light redirection properties of the optical component 10 are discussed in detail below.

Light incident on points P1 and P2 of the textured portions of the inner surface 13a interact with the microstructures in those regions of the textured surface and is scattered randomly in different directions. In contrast if the inner surface 13a in the vicinity of points P1 and P2 was not textured, light emitted from the LED emitter 21 would be refracted along a path that is determined by Snell's law of refraction. By scattering different wavelengths of light randomly in different directions, the textured surface can reduce color non-uniformity. The amount of color mixing provided by the inner surface 13a can depend on the density and the size of the microstructures. For example, if the density of microstructures on the inner surface 13a is high, then the inner surface 13a may be capable of providing a large amount of color mixing. In contrast, if the density of microstructures on the inner surface 13a is low, then the inner surface 13a may be capable of providing a small amount of color mixing The density and size of the microstructures on the inner surface 13a can be adjusted depending on the color uniformity of the LED emitter 21. For example, if the LED emitter 21 has a high degree of color uniformity such that little to no color mixing is required, then the inner surface 13a can have a low density of microstructures. Accordingly, the inner surface 13a can be minimally textured or not textured at all. However, if the LED emitter 21 has a low degree of color uniformity such that a large amount of color mixing is required, then the inner surface 13a can have a high density of microstructures. Accordingly, the inner surface 13a can be heavily textured.

Moreover different portions of the inner surface 13a could have different densities of microstructures to provide different color mixing capabilities for light emitted at different angles. For example, consider an implementation of a LED emitter 21 that has a high degree of color uniformity for light emitted at small angles with respect to the central axis 11 which are incident on the portion of the inner surface 13a toward the top surface 12 and has a low degree of color uniformity for light emitted at large angles with respect to the central axis 11 which are incident on the portion of the inner surface 13a toward the bottom surface 12. For such an implementation of a LED emitter, the portion of the inner surface 13a toward the top surface 12 can have a low density of microstructures thereby providing a small amount of color mixing while, the portion of the inner surface 13a toward the bottom surface 19 can have a high density of microstructures thereby providing a large amount of color mixing. Accordingly, the microstructures can be arranged to form a regular pattern, an irregular pattern, randomly and/or periodically depending on the desired amount of color mixing required. For LEDs with poor color uniformity, the top surface 12 can also be partially or entirely textured to increase color mixing as discussed above. As discussed above, the amount of texturing of the top surface can be selected such that color mixing is increased without significantly reducing the amount of light scattering.

In various implementations, the peripheral region 20 of the bottom surface can 20 can also be textured to diffuse or scatter any light redirected towards the bottom surface 19 by the top surface 12. Since, the peripheral region 20 is inclined with respect to the central region 21, as discussed above, light diffused or scattered by the peripheral region 20 is directed toward the side surface 17 instead of being redirected toward the top surface 12. If the peripheral region 20 were not inclined as discussed above, light redirected towards the bottom surface 19 by the top surface 12 would be redirected back towards the top surface 12 and either be lost or result in an increase in the peak in the center of the illumination area. However, by inclining the peripheral region 20 with respect to the central region 21 light redirected towards the bottom surface 19 by the top surface 12 and incident in the vicinity of point P3 on the peripheral region 20 is redirected toward the side surface 17 and extracted along a direction away from the central axis 11 such that the light extraction efficiency can be increased and the light uniformly distributed across the illumination area by reducing one or more intensity peaks.

In addition to redirecting light, the textured surfaces of the peripheral region 20 of the bottom surface 19 and/or the annular structure 8 can also be configured to mix and/or blend different wavelengths of light, as discussed above.

In various implementations, some of the light redirected towards the bottom surface 19 by the top surface 12 can be redirected out of the optical component 10 such that it is incident on the PCB 112 or a bottom reflector integrated with the optical component, for example, at point P4 in FIG. 3. By providing a redirecting element on the PCB 112 or by configuring the PCB 112 as a redirecting element, light incident on the PCB can be redirected upwards towards the illumination panel. As discussed above, the PCB 112 can be reflective. The reflectivity of the bottom reflector and/or the PCB 112 can affect the intensity of light in the region of the illumination surface directly overhead the optical component. Accordingly, the illuminance profile (or the intensity of light) across the illumination surface can be tailored by adjusting the reflectivity of the reflector and/or PCB integrated with the optical component. For example, the redirecting element or the PCB 112 can be configured to redirect the light incident on the PCB 112 in a direction away from the central axis 11 such that the intensity in the central region of the area of illumination is reduced. In various implementations, the redirecting element on the PCB 112 can be a diffused reflector, a specular reflector, a scattering element, etc.

In panel light or backlighting applications where the optical distance between the LED emitter and the illumination surface is small (e.g., between about 15-18 mm, between about 13-20 mm, less than 20 mm), the intensity of the light in the central region (e.g., in a region located within a distance of about 10 mm from a position on the illumination surface that intersects the central axis 11) can be affected by the reflectivity of the portion of the PCB 112 directly below the optical component. In such implementations, the reflectivity of the reflector adjacent the bottom surface 19 of the optical component or the reflectivity of the portion of the surface of the PCB 112 directly below the optical component can be selected to reduce intensity peaks and/or dips in the central region. Furthermore, the portion of the surface of the PCB 112 directly below the optical component can be textured to mix different wavelengths of light and/or to spread the light output from the optical component uniformly across the illumination surface.

Figure 4:
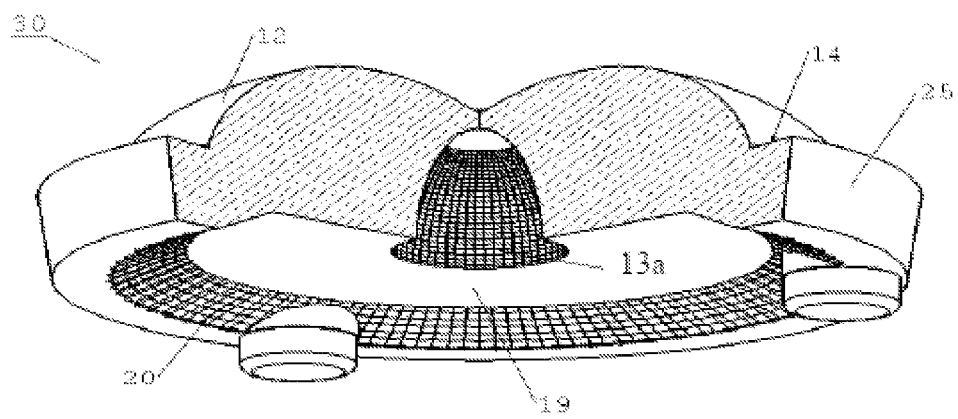
FIG. 4 illustrates a side-view of another embodiment of an optical component configured to mix different wavelengths of light emitted from a LED emitter and/or reduce peaks in the intensity distribution of light emitted from a LED emitter.

FIG. 4 illustrates a side-view of another embodiment of an optical component 30 configured to mix different wavelengths of light emitted from a LED emitter and/or reduce peaks in the intensity distribution of light emitted from a LED emitter. The optical component 30 differs from the optical component 10 in that the annular structure 8 is not distinct from the side surface 17. Instead, the annular structure 8 is incorporated in the side surface 17 to form a combined side surface 25. Thus, portions of the side surface 25 can be textured to provide color mixing and/or light spreading functions.

Figure 5:
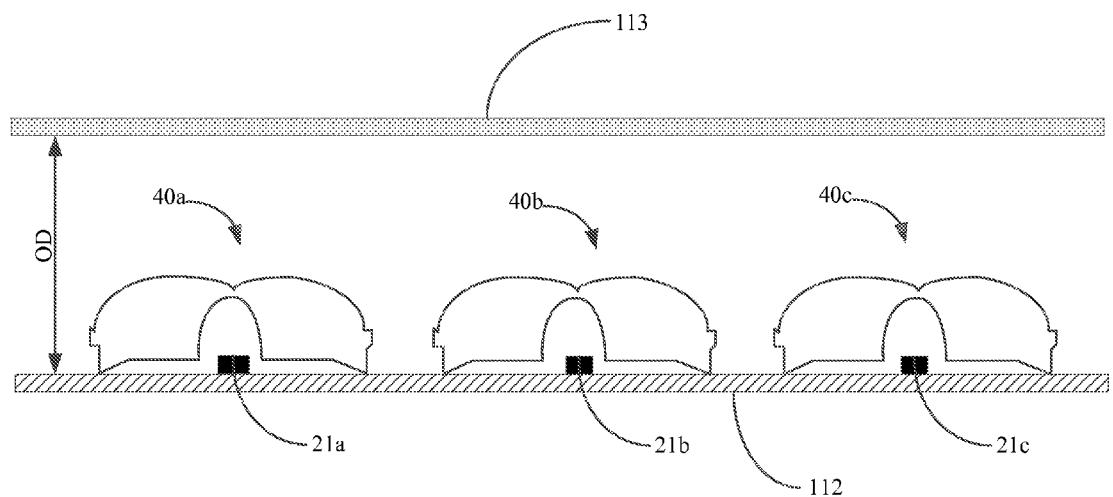
FIG. 5 illustrates a cross sectional view of a light bar including an array of LED emitters and an array of optical components.

The optical component 10 or 30 can be integrated with an LED emitter for use in a backlight or a panel light as discussed below. FIG. 5 illustrates a cross sectional view of a light bar including an array of LED emitters 21a, 21b and 21c and an array of optical components 40a, 40b and 40c. The array of LED emitter 21a-21c can be mounted on a PCB 112. Each LED emitter 21a-21c is associated with a corresponding optical component 40a-40c. The bottom surfaces of each of the optical component 40a-40c can be integrated with a reflector as discussed above. The reflector can have an opening sized and shaped such that when the optical component 40a-40c is disposed over a corresponding LED emitter 21a-21c, light emitted from the LED emitter is coupled into the optical component. As discussed above, the reflectivity of the reflector can be tailored to achieve desired illuminance and average CCT at the illumination surface.

Various structural and functional features of the optical components 40a-40c can be similar to the various structural and functional features of optical components 10 and 30 discussed herein. The optical component 40a-40c can be configured to tailor the radiation pattern of light emitted from the corresponding LED emitter 21a-21c by mixing and/or blending different wavelengths of light emitted from the LED emitter 21a-21c and/or uniformly distribute light emitted from the LED emitter 21a-21c over an area of the illumination panel 113 by reducing peaks in the intensity distribution across the area. In various implementations of the light bar or panel light, the illumination panel 113 can be disposed at a distance less than 25 mm from the array of LED emitters 21a-21c.

For example, the light bar including an array of LED emitters 21a-21c and an array of optical components 40a-40c can be configured to provide an average correlated color temperature that is substantially equal to or within about ±20% of the average correlated color temperature of the LED emitters 21a-21c. The light bar including an array of LED emitters 21a-21c and an array of optical components 40a-40c can also be configured to provide an illuminance does not have large variations. For example, the illuminance within a distance of about 10 mm from the point where the central axis intersects the illumination surface can be not less than 80% of the maximum illuminance. As another example, the illuminance within a distance of about 50 mm from the point where the central axis intersects the illumination surface can be not less than 50% of the maximum illuminance.

Figure 6B:
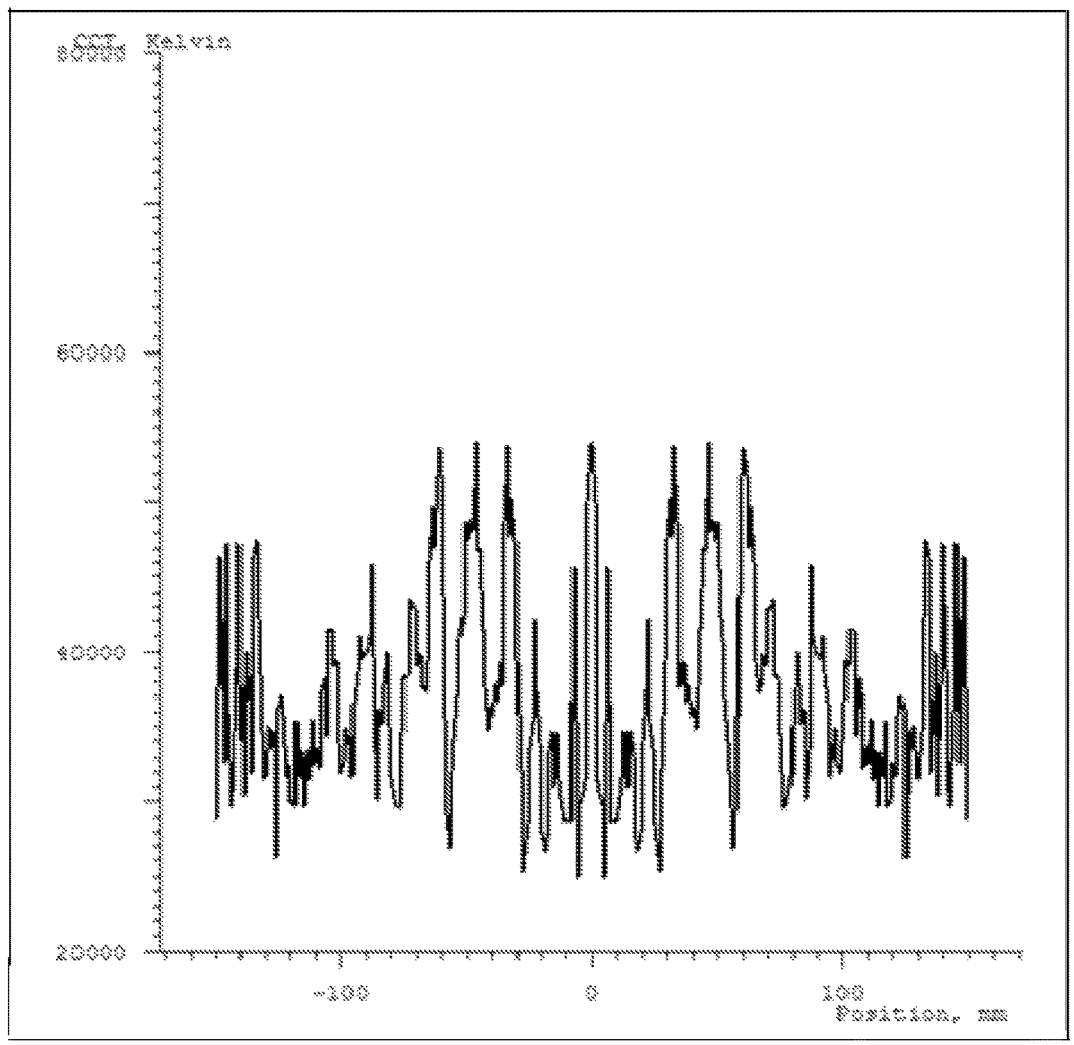
FIG. 6B illustrates the variation in the correlated color temperature (CCT) across the illumination surface disposed at a distance from an illumination system comprising a LED emitter and an implementation of a color mixing optical component as described herein.

FIG. 6B illustrates the variation in the CCT across an illumination surface disposed at a distance between about 10-30 mm from a LED emitter that can result when the LED emitter is optically coupled with an implementation of a light redistributing and color mixing optical component (e.g., 10, 30, 40a-40c) as described herein. The correlated temperature across the illumination surface varies between about 60000 Kelvin and about 20000 Kelvin. It is observed from FIG. 6B that in contrast to FIG. 6A, the average CCT value in a central illumination region located within a distance of about 10 mm from a position on the illumination surface that intersects the central axis of the LED emitter is less than 30% of the maximum CCT on the illumination surface. Furthermore, it is observed that the variation in the average CCT in the central illumination region located within a distance of about 10 mm from a position on the illumination surface that intersects the central axis of the LED emitter and the illumination region located within a distance between about 40-80 mm from the position on the illumination surface that intersects the central axis of the LED emitter is less than 25% (e.g., 5-20%). Accordingly, the illumination pattern can have a uniform color appearance without the appearance of yellow and/or blue rings.

It is further noted that a variation between a maximum correlated color temperature (CCT) and a minimum CCT is less than 60% of the maximum CCT on the illumination surface which also indicates less variation in the color appearance. Additionally, the average CCT across the illumination surface can be substantially equal to or within about ±20% of the average CCT of the LED emitter.

CONCLUSION

The implementations of optical components 10, 30 and 40a-40c described herein can comprise materials that are transparent or transmissive to wavelengths in UV, visible and/or IR spectrum. For example, the optical components 10 and 30 can comprise materials including but not limited to inorganic glass, organic glass, optical grade polymer or composite materials. The inner cavity 13 and 23 of the optical components 10 and 20 can include a material having a refractive index that is lower than the refractive index of the material of the optical components 10, 30 and 40a-40c. For example, in various implementations, the inner cavity 13 and 23 can include air, nitrogen, argon, xenon or some other gas. In various implementations, the optical components 10, 30 and 40a-40c can be fabricated as a monolithic structure. In various implementations, the annular structure 8 can be integrated with other surfaces of the optical components 10, 30 and 40a-40c. The optical components 10, 30 and 40a-40c can be manufactured using known manufacturing methods including but not limited to glass turning, glass blowing, molding, casting and embossing, 3D printing, etc. Various implementations, of optical components 10, 10a, 10b, 10c, and 20 can be fabricated as a unitary or a monolithic structure. For example, optical components 10, 10a, 10b, 10c, and 20 can be fabricated by inserting optical grade material into a mold.

The plurality of microstructures can be disposed on the various surfaces of the optical components 10, 30 and 40a-40c using methods, such as, for example, patterning, etching, photolithography, 3D printing, embossing, machining, etc. In those implementations of optical components 10, 30 and 40a-40c that are manufactured using a molding method, metal or other particles can be disposed on those surfaces of the mold that correspond to the surfaces of the optical components 10, 30 and 40a-40c that are textured such that during the molding process, a texture is imparted to the optical grade material that comes in contact with the surfaces of the mold including metal or other particles.

References throughout this specification to "one embodiment," "an embodiment," "a related embodiment," "an implementation," or similar language mean that a particular feature, structure, or characteristic described in connection with the referred to "embodiment" or "implementation," is included in at least one embodiment of the present invention. Thus, appearances of the phrases "in one embodiment," "in an embodiment," and similar language throughout this specification may, but do not necessarily, all refer to the same embodiment. It is to be understood that no portion of disclosure, taken on its own and in possible connection with a figure, is intended to provide a complete description of all features of the invention.

In the drawings like numbers are used to represent the same or similar elements wherever possible. The depicted structural elements are generally not to scale, and certain components are enlarged relative to the other components for purposes of emphasis and understanding. It is to be understood that no single drawing is intended to support a complete description of all features of the invention. In other words, a given drawing is generally descriptive of only some, and generally not all, features of the invention. A given drawing and an associated portion of the disclosure containing a description referencing such drawing do not, generally, contain all elements of a particular view or all features that can be presented is this view, for purposes of simplifying the given drawing and discussion, and to direct the discussion to particular elements that are featured in this drawing. A skilled artisan will recognize that the invention may possibly be practiced without one or more of the specific features, elements, components, structures, details, or characteristics, or with the use of other methods, components, materials, and so forth. Therefore, although a particular detail of an embodiment of the invention may not be necessarily shown in each and every drawing describing such embodiment, the presence of this detail in the drawing may be implied unless the context of the description requires otherwise. In other instances, well known structures, details, materials, or operations may be not shown in a given drawing or described in detail to avoid obscuring aspects of an embodiment of the invention that are being discussed. Furthermore, the described single features, structures, or characteristics of the invention may be combined in any suitable manner in one or more further embodiments.

The features recited in claims appended to this disclosure are intended to be assessed in light of the disclosure as a whole.

As used herein, a phrase referring to "at least one of" a list of items refers to any combination of those items, including single members. As an example, "at least one of: a, b, or c" is intended to cover: a, b, c, a-b, a-c, b-c, and a-b-c.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. An optical apparatus for use with a light source comprising at least one light emitting diode (LED), the apparatus comprising:
   a single-piece, light-transmitting body comprising a top, a bottom and a side interconnecting the top and the bottom, wherein an imaginary central axis of the body passes through the top and the bottom and does not pass through the side;
   at least one top curved surface formed on the top of the body;
   a bottom cavity formed into the body in a central portion of the bottom such that the central axis passes through the bottom cavity, wherein the bottom cavity is arranged relative to the light source such that the light source is placed under the bottom cavity and the central axis passes through the light source along with the top and bottom cavity and further such that the bottom cavity comprises at least one light input surface configured to receive light beams from the light source that are not reflected while propagating from the light source to the at least one light input surface when the bottom cavity and the light source are so arranged; and
   microstructures configured to diffuse light beams incident thereto and formed on the bottom of the body, wherein the microstructures comprise a first microstructure that provides a plurality of micro-surfaces having different tangential planes, which enables two or more parallel light beams incident to the first microstructure to reach different micro-surfaces that would let the two or more parallel light beams leave the first microstructure in different directions, wherein all or part of the plurality of micro-surfaces are continuously curved with or discretely separated from their immediately neighboring micro-surfaces.

2. The apparatus of claim 1, wherein the microstructures are formed on the at least one light input surface of the bottom cavity.

3. The apparatus of claim 2, wherein the bottom cavity comprises a central portion and a peripheral portion, wherein the central axis passes through the central portion, wherein the peripheral portion is located around the central portion when viewed from the top along the central axis, wherein the microstructures are formed on the peripheral portion of the bottom cavity and not formed on the central portion of the bottom cavity.

4. An optical apparatus for use with a light source comprising at least one light emitting diode (LED), the apparatus comprising:
   a single-piece, light-transmitting body comprising a top, a bottom and a side interconnecting the top and the bottom, wherein an imaginary central axis of the body passes through the top and the bottom and does not pass through the side;
   at least one top curved surface formed on the top of the body;
   a bottom cavity formed into the body in a central portion of the bottom such that the central axis passes through the bottom cavity, wherein the bottom cavity is arranged relative to the light source such that the light source is placed under the bottom cavity and the central axis passes through the light source along with the top and bottom cavity and further such that the bottom cavity comprises at least one light input surface configured to receive light beams from the light source that are not reflected while propagating from the light source to the at least one light input surface when the bottom cavity and the light source are so arranged; and
   microstructures configured to diffuse light beams incident thereto and formed on the bottom of the body, wherein the height of the body is from about 3 mm to about 7 mm, wherein the microstructures are formed on the peripheral portion of the bottom cavity located at a distance in a radial direction from the central axis from about 5 mm to about 9 mm.

5. The apparatus of claim 1, wherein the bottom comprises a bottom peripheral surface provided on the bottom around the bottom cavity when viewed from the top along the central axis, wherein the microstructures are formed on the bottom peripheral surface.

6. The apparatus of claim 1, wherein the bottom comprises a first bottom peripheral surface and a second bottom peripheral surface provided on the bottom around the bottom cavity, wherein the first bottom peripheral surface is interposed between the second bottom peripheral surface when viewed from the top along the central axis, wherein the microstructures are formed on the second bottom peripheral surface and are not formed on the first bottom peripheral surface.

7. The apparatus of claim 6, wherein the second bottom peripheral surface with the microstructures is inclined relative to an imaginary plane that is perpendicular to the central axis such that a first point on the second bottom peripheral surface closer to the central axis in a radial direction is raised relative to a second point on the second bottom peripheral surface farther from the central axis in a radial direction.

8. The apparatus of claim 6, wherein inclination of the second bottom peripheral surface is generally symmetrical relative to the central axis.

9. The apparatus of claim 1, further comprising additional microstructures configured to diffuse light beams incident thereto and formed on a side surface of the side of the body.

10. The apparatus of claim 9, wherein the side surface comprises a first portion generally facing away from the bottom cavity in a direction along the central axis and a second portion generally facing away from the bottom cavity in radial directions from the central axis, wherein the first and second portions are immediately neighboring with each other, the additional microstructures are formed on both the first and second portions.

11. An optical apparatus for use with a light source comprising at least one light emitting diode (LED), the apparatus comprising:
  a single-piece, light-transmitting body comprising a top, a bottom and a side interconnecting the top and the bottom, wherein an imaginary central axis of the body passes through the top and the bottom and does not pass through the side;
  at least one top curved surface formed on the top of the body;
  a bottom cavity formed into the body in a central portion of the bottom such that the central axis passes through the bottom cavity, wherein the bottom cavity is arranged relative to the light source such that the light source is placed under the bottom cavity and the central axis passes through the light source along with the top and bottom cavity and further such that the bottom cavity comprises at least one light input surface configured to receive light beams from the light source that are not reflected while propagating from the light source to the at least one light input surface when the bottom cavity and the light source are so arranged; and
  microstructures configured to diffuse light beams incident thereto and formed on the bottom of the body, wherein when the light source is placed under the bottom cavity and the central axis passes through the light source along with the top and bottom cavity, the apparatus is configured to provide illumination characteristics that at an optical distance within a range of 10-30 mm, an average correlated color temperature in a first region within 10 mm from the central axis is within about ±20% of an average correlated color temperature in a second region between 10-40 mm from the central axis.

12. The apparatus of claim 1, wherein when the light source is placed under the bottom cavity and the central axis passes through the light source along with the top and bottom cavity, the apparatus is configured to provide illumination characteristics that a correlated color temperature is between 60000 K and 20000 K at an optical distance in a range of 10-30 mm.

13. The apparatus of claim 1, wherein when the light source is placed under the bottom cavity and the central axis passes through the light source along with the top and bottom cavity, the apparatus is configured to provide illumination characteristics that at an optical distance in a range of 10-30 mm variation of correlated color temperature is less than 30% from the maximum correlated color temperature.

14. An illumination device comprising:
  the apparatus of claim 1; and
  a light source comprising at least one light emitting diode (LED),
  wherein the light source is arranged relative to the apparatus such that the central axis passes the light source and light beams emitted from the light source are directed to the at least one light input surface without reflection before reaching the at least one light input surface.

15. The device of claim 14, wherein the illumination device has illumination characteristics that at an optical distance in a range of 10-30 mm, an average color temperature is within about ±20% of an average correlated color temperature of the at least one light emitting diode.

16. The device of claim 15, wherein the device has illumination characteristics that a correlated color temperature is between 60000 K and 20000 K at an optical distance in a range of 10-30 mm.

17. An illumination system comprising:
  a plurality of illumination devices comprising the illumination device of claim 15, wherein the plurality of illumination devices are aligned to form a linear arrangement or an array.

18. A back lighting unit of an LCD display panel comprising the illumination system of claim 17.

19. An LCD display panel comprising the back lighting unit of claim 18.

20. A consumer electronic device comprising an LCD display panel of claim 19.

* * * * *